United States Patent [19]

Bacardit

[11] 4,296,673
[45] Oct. 27, 1981

[54] POWER STEERING MECHANISM

[75] Inventor: Juan S. Bacardit, Barcelona, Spain

[73] Assignee: Bendiberica S.A., Barcelona, Spain

[21] Appl. No.: 913,620

[22] Filed: Jun. 8, 1978

[30] Foreign Application Priority Data

Jun. 11, 1977 [ES] Spain ................................. 459.711
Jun. 14, 1977 [ES] Spain ................................. 459.740

[51] Int. Cl.³ .................... F15B 9/10; F15B 15/22; F15B 13/042
[52] U.S. Cl. .................................. 91/375 A; 91/400; 91/437
[58] Field of Search ................. 91/375 A, 437, 375 R, 91/400

[56] References Cited

U.S. PATENT DOCUMENTS

| | | | |
|---|---|---|---|
| 3,465,842 | 9/1969 | Hruska | 91/375 A |
| 3,722,368 | 3/1973 | Suzuki | 91/375 R |
| 3,735,832 | 5/1973 | Akima | 137/625.2 X |
| 3,896,702 | 7/1975 | Shah et al. | 91/437 |
| 3,905,277 | 9/1975 | Rosell | 91/437 |
| 3,924,705 | 12/1975 | Sugisawa | 91/437 |

Primary Examiner—Paul E. Maslousky
Attorney, Agent, or Firm—Paul David Schoenle; Ken C. Decker

[57] ABSTRACT

A power steering mechanism includes a control valve which acts both to control the flow of pressurized fluid to and from a pair of working chambers of the mechanism and as a pressure relief valve to limit the maximum pressure which may be communicated to the working chambers. The valve includes a stack of plane annular discs which are relatively rotatable and arranged coaxially with the control shaft of the steering mechanism. The discs are resiliently biased together and define valve ports and compartments which cooperate to control the flow of pressure fluid dependent upon the relative rotational positions of the discs. Rotation of the control shaft causes rotation of one of the discs relative to the others to correlate the ports and chambers so as to supply pressure fluid to one chamber and to vent fluid from the other chamber. If the fluid pressure within the compartments of the control valve should exceed a predetermined value, the resilient bias holding the discs together is overcome and the discs separate slightly to open communication between the fluid supply ports and the vent ports.

Another embodiment of the mechanism includes a linkage arranged to separate the discs and an abutment which cooperates with the linkage when the mechanism reaches either end of its range of travel. The working chambers are incapacitated when the linkage separates the discs so as to prevent damage to the mechanism from a too-high fluid pressure.

11 Claims, 10 Drawing Figures

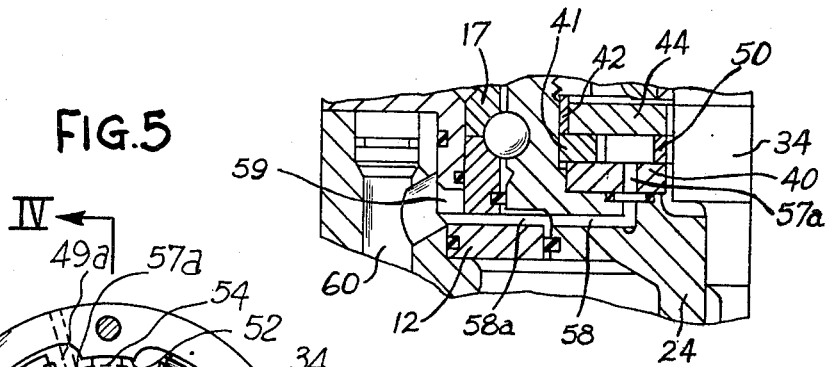
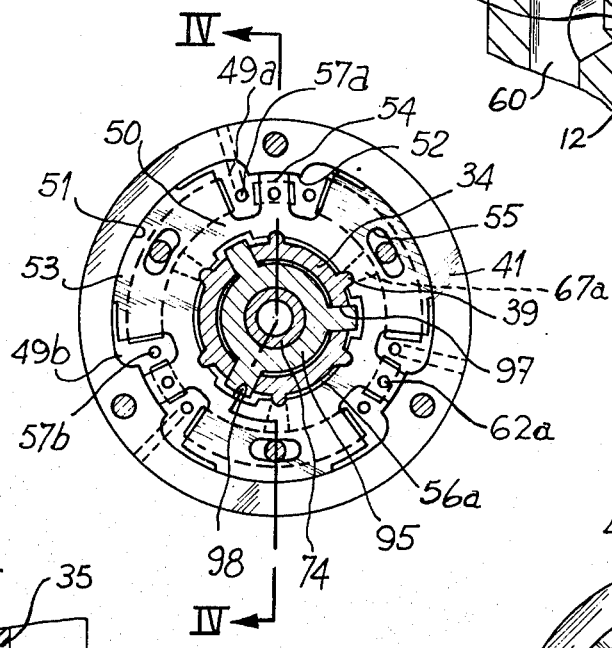
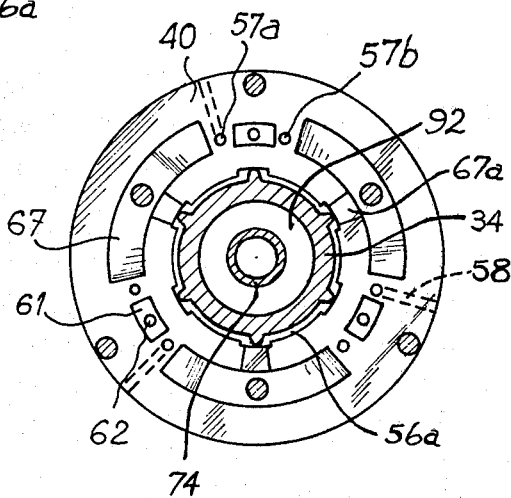
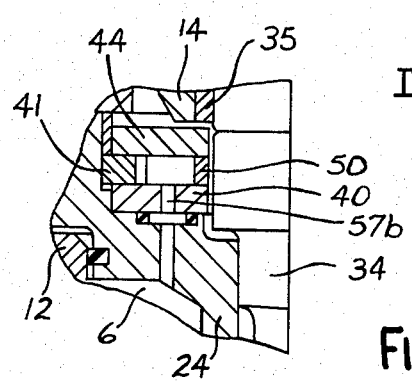
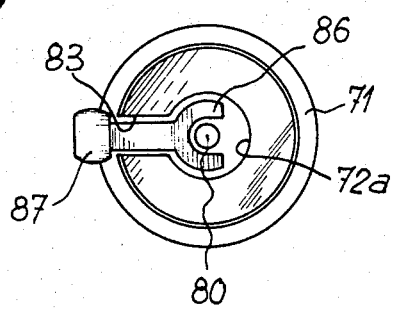
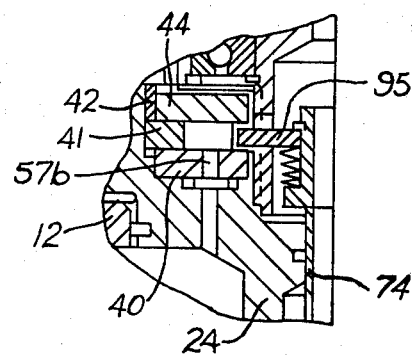

POWER STEERING MECHANISM

The present invention generally relates to power steering mechanisms, and more particularly to improvements in control valves for such power steering mechanisms.

Power assisted steering systems for vehicles are known which comprise a device for limiting the working pressure in the system so as to avoid damage to the steering mechanism by excessive pressure when the steerable wheels of the vehicle encounter excessive resistance to turning. Pressure limiters of this kind usually take the form of dynamic fluid valve devices disposed in the installation piping forming part of the system. They therefore take up a corresponding amount of space in the installation, and consideration must be given to them at the design stage, if they are suitably accessible for inspection.

Therefore it is an object of the present invention to design a new control valve which comprises a pressure limiter without an appreciable increase in the dimensions of the valves.

According to the present improvements, therefore, one of the axial surfaces of a discoid chamber is in the form of a member movable along the axis of the valve device between a first position, in which it engages with the adjacent surface of a rotor to bound fluid distribution chambers, and a second position away from the rotor surface, in which latter position it interconnects the distribution chambers and equalizes the pressures on both sides of the servo actuator, the movable member being biased towards the first position by resilient means calibrated to apply a force corresponding to the maximum required working pressure.

Preferably, the discoid chamer is formed by a first plane annular disc formed with the distribution ports and the ducts for communication with the servo actuator, the input spindle of the steering box or a control element therefor engaging rotatably the central orifice of such disc, with a second stationary annular discoid member in whose interior the rotor engages, a spacing sleeve whose axial length is greater than the thickness of the axially movable member and in which the same engages slidingly, and retaining means securing the various elements in position in a recess.

The resilient means for biasing the movable member can have various shapes conventional in the art; according to another feature of the invention, however, such means take the form of a set of Belleville rings maintained in compression between, on the one hand, that surface of the discoid member which is furthest from the rotor and, on the other hand, an end abutment of a longitudinal rod extending through said first discoid member and the rotor, and connected to the axially movable member.

According to the invention, it is proposed a control valve in particular for power steering mechanism having rotatable coaxial input and output members, characterized in that said control valve comprises a disc-shaped chamber defined in one of said input and output members and coaxial with said members, and a rotor rotatably connected to the other of said input and output members, said rotor sealingly separating said disc-shaped chamber into a plurality of peripheral chambers communicating alternately with corresponding working chambers of a double acting servo actuating cylinder of the power steering mechanism, at least one of the axial surfaces of the disc-shaped chamber being formed with ports connected alternately to the fluid inlet and outlet of a pressure source and arranged at angular positions such as to be partially closed by the rotor when the valve is in its normal position, while in every operating position the inlet and outlet communicate with the corresponding chambers of the servo-actuator, the other of the axial surfaces of the disc shaped chamber being defined by a member movable along the axis of said chamber, between a first position in which it engages with the adjacent surface of the rotor to sealingly separate the distribution chambers, and a second position away from the rotor surface, in which second position it interconnectes said distributing chambers and equalises the pressure in the working chambers of the actuating cylinder.

It is also known in steering mechanisms for motor vehicles wherein a double-acting hydraulic actuating cylinder is provided to assist the mechanism in response to operation of the vehicle steering wheel in either direction to use end-stop valves which render the cylinder inoperative when a system reaches either one of its end positions, so as to avoid unnecessary forces and so as not to waste power.

Valves of this kind are usually disposed in ducts which interconnect the working chambers of the cylinder and which are opened when the mechanism reaches an end position. In some cases the valve is rigidly secured to the steering box and is operated by one of the moving elements thereof such as the nut-like piston or the sector or quadrant, while in other cases the valve is disposed in the actual piston and operates upon abutment with the corresponding cylinder ends. However, all these constructions require the use of additional valve devices which increase manufacturing costs and make the fitting and adjustment of the steering box a time-consuming operation.

Therefore, it is a further object of the present invention to propose a device of the above type, in which are provided means for acting as end stop valves, said means providing a very simple solution of the problems described.

According to these improvements, therefore, the free end of a steering-box spindle has an abutment for detecting the two end positions of the nut-like piston and connected, by way of a transmission extending along such spindle and terminating in opposite abutment, at the movable wall of the discoid chamber to displace the same from its sealing-tight position upon arrival of the mechanism at one of its end positions.

Preferably, the transmission is a rod sliding axially along the spindle, one of the rod ends being associated with the abutment-like detector while the other has a spider disposed for backlash resilient biasing, the spider arms extending into the discoid chamber to form thrust elements acting upon the movable wall of the latter chamber.

Also, the abutment for detecting the end conditions can take the form of an axial prolongation of the rod end, such prolongation being connectable to the base of the blind bore in the piston, and of a lever disposed radially and articulated at one end to the rod and having at its projecting end an abutment connectable to a step with which the blind bore is formed in a position opposite to its base. Conveniently, the prolongation of the transmission rod takes the form of the pin in adjustable screw threaded engagement with a matching bore in the rod ends and having an actuating element accessible from outside the box by way of coaxial orifices in the spindle and in the element providing the connection of the steering.

The invention will now be described, by way of example, with reference to the accompanying drawings wherein:

FIG. 5 is a fragmentary view in cross-section and on an enlarged scale taken along line V—V of FIG. 4;

FIG. 6 is a fragmentary view in cross section and on an enlarged scale along line VI—VI of FIG. 4;

FIG. 7 is a view in the direction of arrow VII in FIG. 4, showing a detail of the power steering mechanism.

FIGS. 8 and 9 are fragmentary sectional views of the FIG. 1 embodiment.

FIG. 10 is a fragmentary sectional view of the FIG. 4 embodiment.

Figure 1:
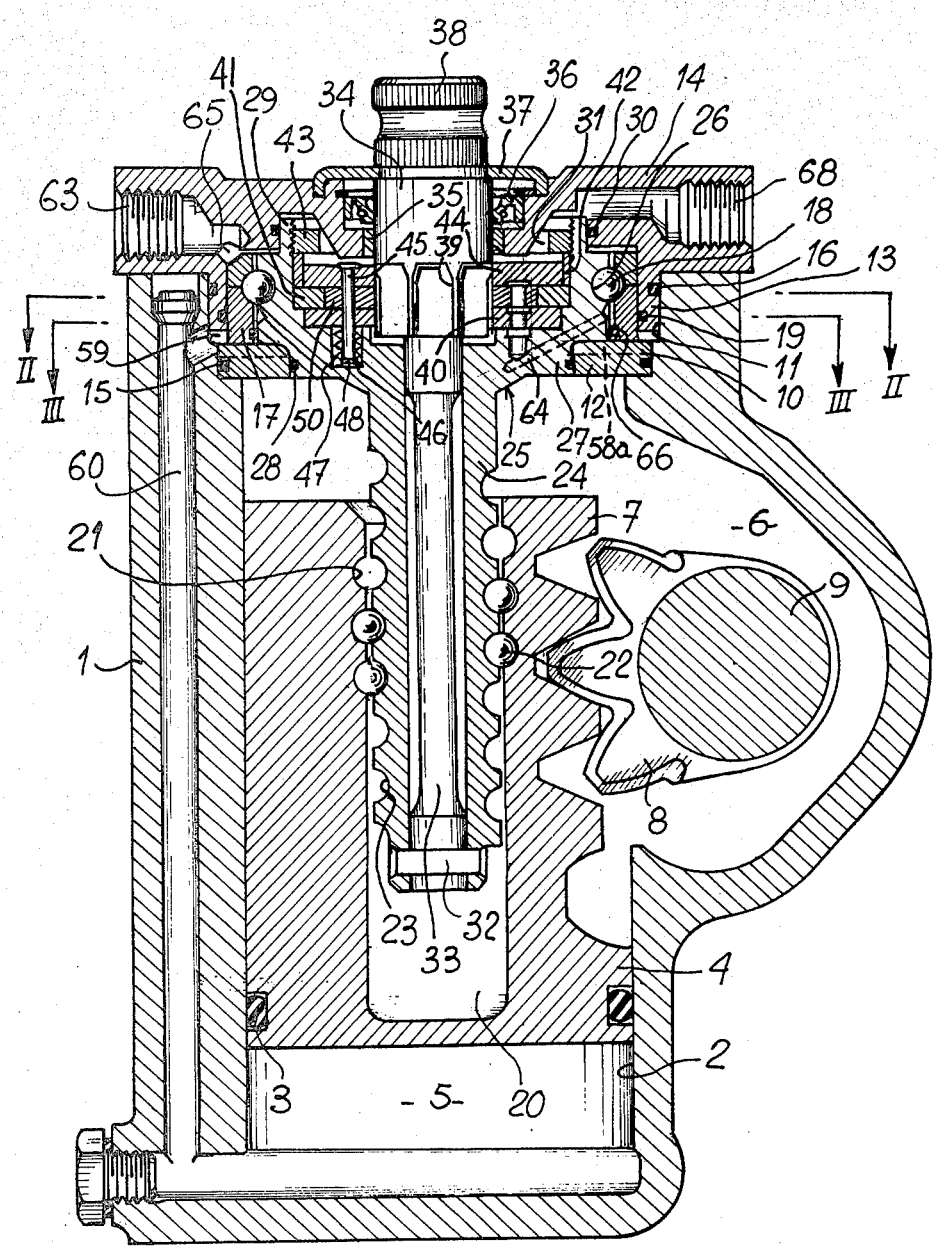
FIG. 1 is an axial section of a steering box comprising a control valve according to the invention.

Referring now to FIGS. 1 and 3, and 8, 9, there is shown a steering box forming an internal cylinder 2 which has a casing 1. Adapted to move freely in cylinder 2, and in sealing-tight engagement therewith by way of a gasket or the like 3, is a piston 4 which bounds two working chambers 5, 6 of a double-acting hydraulic actuating cylinder formed by the actual steering box. The piston 4 has a toothed rack 7 meshing with a sector or quadrant 8 integral with steering power output shaft 9.

The open end of the box (at the top in FIG. 1) comprises a cylindrical portion 11 of large diameter and an intermediate cylindrical portion 10 having a diameter larger than that of cylinder 2. A first annular shoulder separates cylinder 2 and intermediate portion 10, whereas a second annular shoulder separates intermediate portion 10 and cylindrical portion 11. An annular disc 12 engages the first annular shoulder and sealingly cooperates with annular portion by way of a ring gasket 15. In the same manner, a flange 13 forming part of the cover 14 secured in position by conventional means (not shown), cooperates in a sealing tight-manner with cylindrical portion 11, by means of a ring gasket 16. The disc 12 is retained in position by outer raceways 17 of a ball bearing 18, the raceways being secured by the cover 14, and cooperating in a fluid-tight manner with the flange 13 by means of another gasket 19 interposed between said raceways and flange.

Extending axially through piston 4 is a blind bore 20 whose aperture extends towards the side of the cover 14 and which is formed with an internal helical groove 21 serving as the track for balls 22 of a recirculating ball circuit serving as a nut; this device is conventional, and is not shown in greater detail. Engaging with the balls 22 is a corresponding groove 23 in the tubular steering spindle 24 which projects from the piston and widens into a cup shaped head having the general reference 25, the outside surface of the part 25 having the other raceway 26 for the balls 18. Head 25 also comprises an internal flange or collar or the like 27 having an outer cylindrical surface which enters into hermetic closure with an aperture in the disc 12 by means of a gasket 28; similarly, an external flange 29 engages in sealing-tight manner by way of a gasket 30 with the side surface of a recess 31 in the inside surface of the cover 14.

Rigidly secured by means of a diametrically extending pin 32 to the inside end remote from the head 25 of the spindle 24 is the corresponding end of a torsion rod 33 which extends along the spindle and projects through the head 25, forming a rod 34 which extends through a bearing sleeve 35 in the cover 14 and through a retaining member 36 and a cover plate 37 to form an end 38 for connection to the transmission from the steering wheel. That part of the rod 34 comprised in the recess in the part 25 has ribs 39, as are best illustrated in the FIGS. 2 and 3, adapted for rotational engagement for purposes to be described hereinafter.

The head 25 comprises a recess which has two stepped cylindrical seats near its bottom. An annular discoid plate 40 engages fixedly the first such seat which is adjacent the bottom of the recess, and a distributing ring 41 is disposed thereabove. The two elements 40, 41 are secured in position by means of a spacing sleeve 42 and of an annular nut 43 screwed into the opening of such recess. Disposed above the ring 41 and adapted to slide axially in the sleeve 42 is another annular discoid plate 44 having an axial length smaller than that of the spacing sleeve 42. Plate 44 is formed with three stepped longitudinal bores engaged by the corresponding heads of respective rods 45 extending through the central orifice of the distributing ring 41, through the first discoid plate 40 by corresponding orifices and they terminate in recesses 46 in the bottom of the head 25, the recesses 46 receiving a stack of Belleville rings 47 which are maintained in compression between the plate 40 and a terminal abutment 48 of the rod. Accordingly, the second discoid plate 44 is maintained in engagement with the adjacent surface of the ring 41 and bounds the discoid chamber of the control valve device of the power-assist steering system, such chamber having the general reference 49 in FIG. 1.

Figure 2:
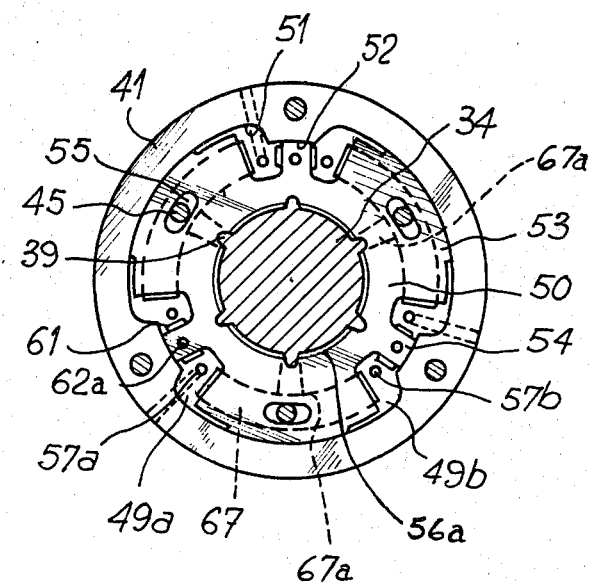
FIG. 2 is a fragmentary view in cross-section and on an enlarged scale taken along line II—II of FIG. 1.
Figure 3:
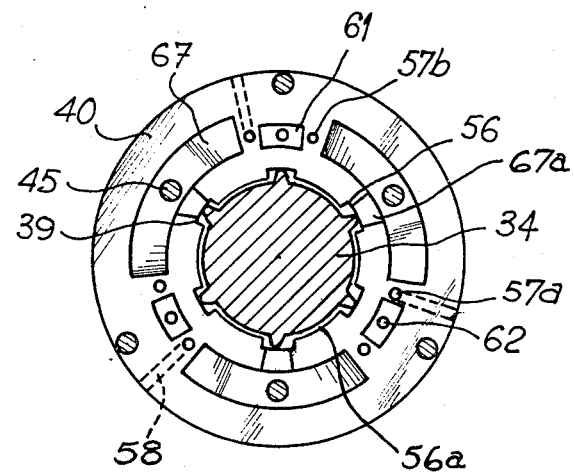
FIG. 3 is a fragmentary view in cross-section and on an enlarged scale taken along line III—III of FIG. 1.
Figure 4:
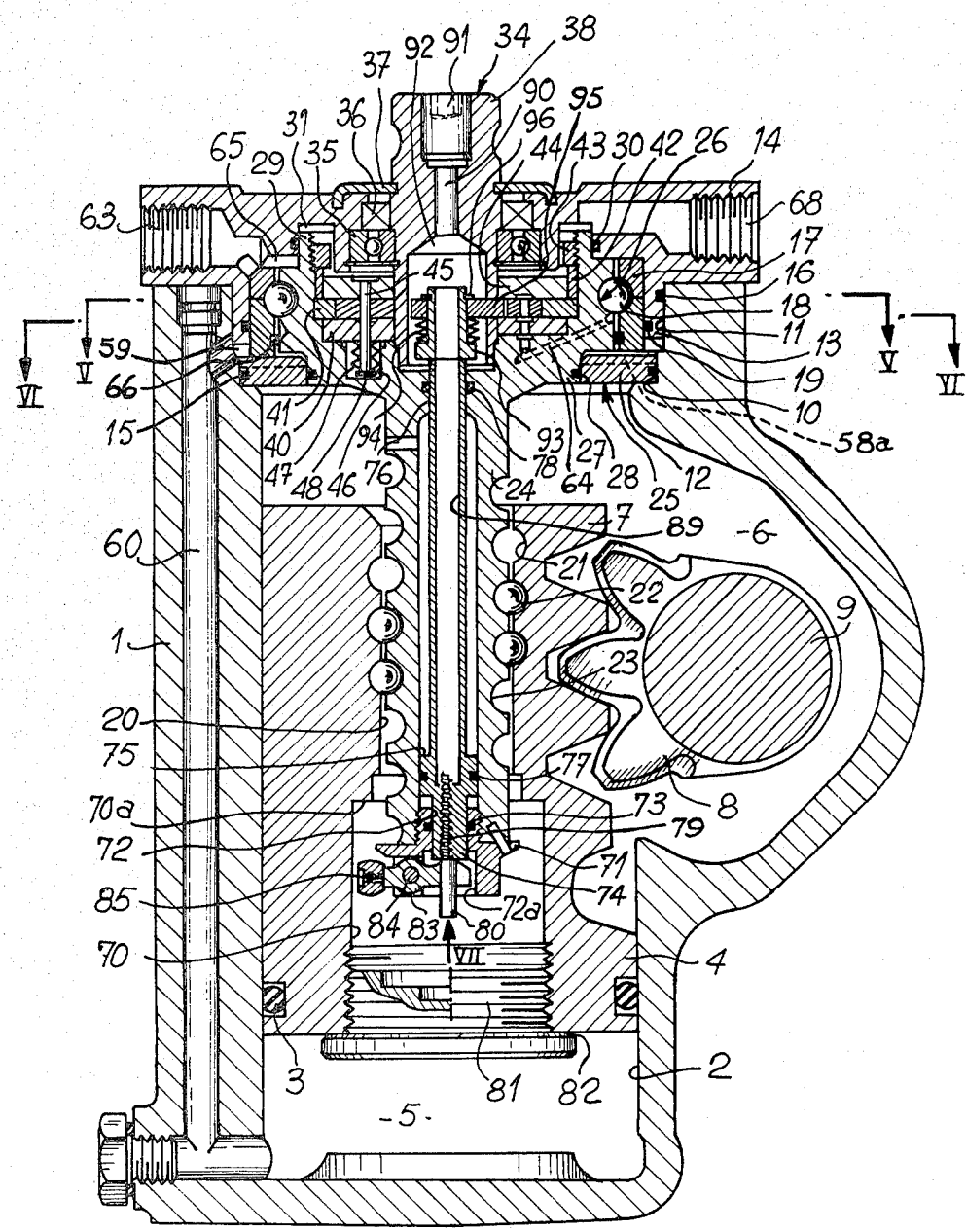
FIG. 4 is a view in cross-section, along line IV—IV of FIG. 5 of a preferred embodiment of a power steering mechanism incorporating a control valve according to the invention, with means acting as stop end valves.

Disposed in chamber 49 is a star-shaped rotor 50 having a central portion from which project six arms like a star and coupled in rotation with the ribs 39 of the rod 34 and engaging with the various surface of the chamber 49. As can be seen in FIG. 2, the ring 41 has two sets of three cylindrical surfaces 51, 52 the surfaces 51 having a larger radius than the surfaces 52, and the rotor has two sets of three arms 53, 54 whose ends engage correspondingly with the surfaces 51, 52 so that the discoid chamber 49 is divided into three pairs of chambers 49a, 49b each disposed on one side of each of the longer arms 53 and of the rotor. The rods 45 extend through peripherally widened apertures 55 (FIG. 2) in the longer rotor arms 53 and the ribs 39 of the rod 34 are received in widened recesses 56 (FIG. 3) of the discoid plates 40, 44 so that the rod 34 and the rotor 50 have provision for limited rotation, with resilient twisting of the bar 33, relatively to the discoid plates 40, 44. The plates 40 and 44 and the rotor 50 each define an axially-extending radial clearance 56a (FIGS. 2, 3) at the surface of rod 34 between the ribs 39.

By way of orifices 57a and ducts, as 58-60, and grooves 58a, illustrated in FIG. 9, the chambers 49a communicate with working chamber 5 of the cylinder, while by way of orifices 57b the chambers 49b have a similar communication illustrated in FIG. 8, with the chamber 6. The grooves 58a comprise radially extending recesses in the upper surface of disc 12 which communicate at their inner end with the radially extending ducts 58 in head 25 and which at their outer ends communicate with the annular space 59 defined by the lower end of flange 13, cylindrical portion 11, raceway 17, and disc 12. Also, disposed opposite the rotor arms 54 are ports 61 from which extend passages 62 communicating with a pressure oil inlet spigot 63 by way of ducts 64, 65 illustrated in FIG. 1 and of the chamber for the ball bearing 18, the latter chamber being closed by the gaskets 19, 30 and by the gasket 66, the latter being disposed between the raceway 17 and the head 25. Similarly, further ports 67 are disposed opposite the rotor arms 53 and communicate by way of radially extending recesses 67a in the upper surface of plate 40, the axially-extending radial clearance 56a, and recess 31 with a spigot 68 for the discharge of oil which has flowed through the device. The arms 54 of rotor 50 include axially extending apertures 62a which communicate the upper surface of rotor 50 with the lower surface thereof and which are necessary in order to hydrostatically balance the rotor in view of the pressure fluid flowing into ports 61 from passages 62. Although this system has not been described in greater detail, it can be appreciated that it defines a distributing rotary valve for the double acting hydraulic actuating cylinder. In operation, i.e. when rotational movment is imparted to the steering wheel, rotation of rotor 50 to either hand relatively to the discoid chamber, for example, rotation of rotor 50 clockwise in FIG. 2 relative to plate 40 and ring 41 has for result that the arms 54 move clockwise relative to the ports 61. Clockwise movement of the arms 54 relative to the ports 61 increases fluid flow communication between the ports 61 and the pressure chambers 49a. Conversely, fluid flow communication between the ports 61 and pressure chambers 49b is decreased by clockwise movement of the arms 54 relative to the ports 61. Similarly, clockwise movement of the rotor 50 relative to the plate 40 moves the arms 53 clockwise relative to the ports 67. Clockwise movement of the arms 53 relative to the ports 67 decreased fluid flow communication between the pressure chambers 49a and the ports 67. On the other hand, fluid flow communication between the pressure chambers 49b and the ports 67 is increased by clockwise movement of the arms 53 relative to ports 67. Because the ports 61 connect with the inlet spigot 63 and pressure chambers 49a and 49b connect with the working chambers 5 and 6, respectively, fluid flow communication from the inlet spigot 63 to working chamber 5 is increased and fluid flow communication from the spigot 63 to working chamber 6 is decreased. Similarly, ports 67 connect with the outlet spigot 68 so that the communication of working chamber 6 with the outlet spigot 68 is increased while communication of working chamber 5 with the spigot 68 is decreased. Because of the unbalanced communication of the working chambers 5 and 6 with the spigots 63 and 68, respectively, working chamber 5 is increased in pressure relative to working chamber 6. The resulting pressure imbalance on piston 4 causes the piston to move upward, viewing FIG. 1, as fluid is supplied to working chamber 5. Fluid vented from working chamber 6 by the upward movment of piston 4 is communicated via orifices 57b to pressure chambers 49b and to outlet spigot 68 via the ports 67, recesses 67a, the axially-extending radial clearance 56a, and recess 31.

Also the springs 47 are so calibrated that the biasing of the movable discoid plate 44 overcomes the reaction of the hydraulic fluid in the chambers 49a or 49b which experience pressure at any given moment, so that the plate 44 remains engaged in its normal operating position shown and the device operates conventionally. If, however, the working pressure should for any reason exceed a desired value corresponding to the calibration of the springs, the pressure in the chambers 49 overcomes the force of the springs and the plate 44 disengages from the rotor to give direct communication between the chambers 49a and 49b and between the chambers 49 and the axially-extending radial clearance 56a between the plate 44 and rod 34. The axially-extending radial clearance 56a communicates with the outlet spigot 68 so that the excess pressure is reduced.

Also, of course, the improvements described are of use for any other kind of steering mechanism having a discoid valve device, for instance, where such device is disposed in the combined rack and piston.

A second embodiment of the invention is now described with reference to FIGS. 4 to 7 and 10. This second embodiment comprises features which are identical or similar to those of the power steering mechanism according to FIGS. 1 to 3 and 8, 9, and such features will not be again described and will be designated by the same numerical references.

The end of bore 20 of piston 4 which is furthest from the valve device widens cylindrically, as indicated by the references 70, and the free end of the steering spindle 24 extends to this recess. Screwed into an axial bore of the spindle is a fitting 71 formed with an axial bore 72 and a recess 72a, open at its free end. Engaging in sealing-tight manner in bore 72 with the interposition of a seal 73 is the end of a rod 74 which also extends in the axial bore of the spindle 24 as far as the recess in the head 25. Rod 74 is guided in the axial bore as shown at surfaces 75, 76, and fluid tightness is obtained by means of seals 77, 78. Rod 74 is formed with a screw threaded axial bore 79, in which engages, with sufficient friction for self-stabilization, a matching rod-like abutment 80 which projects from the member 71 to abut the base of a plug 81 screwed, with the interposition of a seal 82, into the screw-threaded mouthpiece of the recess 70.

Consequently, when the piston 4 reaches the top end of its travel, (considering FIG. 4), the rod 74 moves upwards slightly in relation to the spindle 24; the device makes it possible to have the same movement of the rod 71 when the piston reaches the end of its downwards travel; accordingly, the member 71 is formed with a radial cut 83 through which a spindle 84 extends; freely rockably disposed thereon is a balance lever 85 having a forked end 86 which engages around the member 80, and a spindle-like end for a loose roller 87 projecting from the periphery of the member 71 and adapted to abut the base of the recess 70 at a shoulder 70a when the piston 4 reaches its bottom position.

The rod like abutment 80 is adjustable by any form of actuation to which access is possible from outside the steering box by way of the axial bore 89 in rod 74 and by way of a passage 90 in the control rod 34, the passage 90 being closable by means of a plug 91.

The top end of the tubular rod 74 terminates in an end recess 92 of the member 34 and has a stepped seat 93 against which bears, with the interposition of a stack of Belleville rings 94, a three-armed spider 95 which is biased by its arms against an end stop ring 96. The spider arms extend through apertures 97 in the wall of the member 34 and are received in recesses 98 in the central orifices of the plate 40 and rotor 50 so as to be opposite the downwardly-facing surface of the moving discoid plate 44, so that the upwards movement of the rod 74 separates the plate 44 from its position of sealing-tight engagement with the adjacent rotor surface, and away from the ring 41; spring 94 is a means of compensating for differences of travel between the moving plate 44 and the actuating device described.

The construction described with reference to FIGS. 4 to 7 has the same general operation as the steering boxes having a discoid valve device which has been described with reference to FIG. 1 to 3, and 8, 9, in that rotation of the rotor to either hand permits alternate communication between the cylinder chambers 5, 6 and the hydraulic liquid entry and outlet. Also, the springs 47 are so calibrated that the load applied to the moving plate 44 overcomes the reaction of the hydraulic liquid in the chambers 49a 49b which are under pressure at a particular time so that the plate 44 is retained in the normal operating position shown and the device operates normally. If, however, as for the device shown at FIGS. 1 to 3, the working pressure exceeds for any reason a desired value corresponding to the calibration of the springs 47, the pressure on the chambers 49 overcomes the force of the springs and the plate 44 disengages from the rotor to give direct communication between the pressure and discharge chambers to relieve the excess pressure mentioned. According to a particular operating feature of the device of FIGS. 4 to 7, and 10 the same effect is also obtained whenever the steering mechanism reaches one of its end positions for which the piston 4 then operates the abutment 80 by means of the plug 81, or by means of the roller 87 contacting the base of the widened portion 70 according to the end position (upper or lower) of the piston 4. Therefore, in each case, there results an upwards movement of rod 74, so that the arms of spider 95 disengage the moving plate 44. Therefore it can be appreciated that the power steering mechanism of FIGS. 4 to 7 and 10, incorporates end stop values which render the cylinder inoperative when the system reaches either one of its end positions.

Also, of course, the improvement described are of use with any kind of steering mechanism having a discoid valve device, such as those having such a device in the piston nut or rack.

What we claim is:

1. Control valve in particular for power steering mechanism having rotatable coaxial input and output members, characterized in that said control valve comprises a substantially disc-shaped chamber defined in one of said input and output members and coaxial with said members, and a rotor rotatably connected to the other of said input and output members, said rotor sealingly separating said disc-shaped chamber into a plurality of peripheral chambers communicating alternately with corresponding working chambers of a double acting servo actuating cylinder of the power steering mechanism, at least one of the axial surfaces of the disc-shaped chamber being formed with ports connected alternately to the fluid inlet and outlet of a fluid supply and arranged at angular positions such as to be partially closed by the rotor when the valve is in its normal position, while in every operating position the inlet and outlet communicate with the corresponding chambers of the servo-actuator, one of the axial surfaces of the disc-shaped chamber being defined by a member movable along the axis of said chamber, between a first position in which it engages with the adjacent surface of the rotor to sealingly separate the distribution chambers, and a second position away from the rotor surface, in which second position it interconnects said distributing chambers and equalizes the pressure in the working chambers of the actuating cylinder.

2. Control valve according to claim 1, characterized in that the said movable member is biased towards the first position by resilient means, said resilient means being calibrated to apply a force corresponding to the maximum required working pressure.

3. Control valve according to claim 1, characterized in that the disc-shaped chamber is formed by a first annular plate formed with the distribution ports and the ducts for communication with the actuating cylinder, said plate being fitted at the bottom of an axial recess defined in said one of the input and output members, an annular member being also provided in said recess adjacent said first plate to define the space forming said chamber, a spacing sleeve adjacent said annular member and having an axial length greater than the thickness of the axially movable member, said axially movable member being slidably engaged in said spacing sleeve, and retaining means securing said first plate, said annular member and said spacer ring in position in said recess.

4. Control valve according to claim 3, comprising at least one longitudinal rod connected to the movable member and axially extending through the rotor and terminating by an abutment, said resilient means being formed of a stack of resilient rings maintained in compression between the face of the first annular plate which is the furthest from the rotor, and the abutment of the rod.

5. Control valve according to claim 1, characterized in that said rotor is a star-shaped rotor having arms which engage with the surfaces of the disc shaped chamber to separate the latter into said plurality of peripheral chambers, said arms substantially closing said inlet and outlet of a fluid supply when the valve is in its normal position.

6. Control valve according to claim 1, characterized in that said one of the input and output members is the spindle associated with a nut like piston of the power steering device and the other of said input and output members is an input rod connected to the vehicle steering wheel.

7. Control valve according to claim 1, characterized in that the input rod and spindle are resiliently connected in rotation.

8. Control valve according to claim 6, characterized in that the free end of the steering box spindle has an abutment device for detecting the two end positions of the nut-like piston, and connected by way of a transmission extending through such spindle and terminating in an opposite abutment, at the movable member of the disc shaped chamber, to displace the same from its sealing tight position upon arrival of said piston at one of its end positions.

9. Control valve according to claim 8, comprising a spider mounted in the disc-shaped chamber in which it is axially actuable to urge said movable member away from its first position towards its second position, said spindle comprising an axial bore in which is slidably mounted a control rod forming said transmission, said control rod having one end for actuating said spider and its other end associated with said abutment device to move in said last named axial bore when the nut like piston has reached one of its end-positions.

10. Control valve according to claim 9, characterized in that the free end of the spindle projects in an enlarged portion of a blind bore in the nut like piston, so as to define a shoulder, said abutment device being formed of an axial extension of the control rod which is adapted to be engaged by the end of said blind bore when the nut-like piston eaches one of its end positions to actuate said spider, said abutment device also comprising a lever disposed radially at the end of the spindle, said lever having one arm adapted to be engaged by said shoulder when the nut like piston reaches its other end position so as to provoke pivotal movement of said lever, whereby its other arm urges said control rod to actuate said spider.

11. Control valve according to claim 10 characterized in that the axial extension of the control rod is a pin in adjustable engagement with a matching bore in the end of the control rod.

* * * * *